United States Patent [19]

Lore et al.

[11] Patent Number: 4,564,561
[45] Date of Patent: Jan. 14, 1986

[54] FLUORINE-CONTAINING POLYMER COMPOSITIONS AND THEIR PREPARATION

[75] Inventors: Albert L. Lore; Stuart Raynolds, both of Wilmington, Del.

[73] Assignee: E. I. Du Pont de Nemours and Company, Wilmington, Del.

[21] Appl. No.: 716,422

[22] Filed: Mar. 27, 1985

[51] Int. Cl.$^4$ .................. C08L 27/12; C08L 33/14
[52] U.S. Cl. .................................. 428/422; 428/421; 427/393.4; 525/200; 525/276; 524/520; 526/245
[58] Field of Search .............. 525/200, 276; 428/422

[56] References Cited

U.S. PATENT DOCUMENTS

| 3,378,609 | 4/1968 | Fasick et al. | 260/890 |
| 3,462,296 | 8/1969 | Raynolds et al. | 525/200 |
| 3,544,537 | 12/1970 | Brace | 525/200 |
| 3,637,614 | 1/1972 | Greenwood | 525/200 |
| 4,013,627 | 3/1977 | Temple | 526/245 |
| 4,127,711 | 11/1978 | Lore et al. | 526/245 |

FOREIGN PATENT DOCUMENTS 0124236  7/1984  European Pat. Off. .

Primary Examiner—Carman J. Seccuro

[57] ABSTRACT

Mixtures of (1) a polymer of at least one polyfluoroalkyl acrylate or methacrylate and (2) a copolymer of (a) at least one polyfluoroalkyl acrylate or methacrylate, (b) at least one 3-chloro- (or 3-bromo-) 2-hydroxypropyl acrylate or methacrylate, (c) at least one alkyl acrylate or methacrylate and (d) at least one polyoxyethylene acrylate or methacrylate. Mixtures are prepared by first polymerizing (1) and then (2) (a)–(d). Mixtures are useful as oil- and water-repellents, particularly for rainwear.

25 Claims, No Drawings

FLUORINE-CONTAINING POLYMER COMPOSITIONS AND THEIR PREPARATION

SUMMARY OF THE INVENTION

The present invention relates to fluorine-containing polymeric compositions which impart durable oil- and water-repellency to fibrous substrates, particularly nylon-containing rainwear. It relates also to processes in which such substrates are treated so as to impart durable oil- and water-repellency to them. The invention relates further to such fibrous substrates treated with the compositions of the invention. It relates, in addition, to a manufacturing process for preparing the compositions of the invention.

BACKGROUND OF THE INVENTION

Fasick et al., in U.S. Pat. No. 3,378,609, disclose, amongst others, a mixture of (1) a copolymer derived from at least one compound having the formula $$C_nF_{2n+1}CH_2CH_2O_2CC(CH_3)=CH_2$$

wherein n has a value of from 3 to 14, and at least one polymerizable vinyl compound free of nonvinylic fluorine, such as a compound having the formula $$R^1OC(O)C(R)=CH_2$$

wherein

R is H or $CH_3$ and
$R^1$ is $C_{1-18}$ alkyl, with (2) a vinyl polymer derived from at least one polymerizable compound which is a monovinyl compound free of nonvinylic fluorine or a nonfluorinated conjugated diene.

Lore et al., in U.S. Pat. No. 4,127,711, disclose polymers derived from (1) at least one compound having the formula $$R_fC_mH_{2m}OC(O)C(R)=CH_2,$$

(2) a compound having the formula $$R^1(OCH_2CH_2)_nOC(O)C(R)=CH_2, \text{ and}$$

(3) a compound having the formula $$QCH_2CH_2OC(O)C(R)=CH_2$$

wherein
R is H or $CH_3$,
$R^1$ is $C_{1-18}$ alkyl,
$R_f$ is perfluoroalkyl containing 2 to 20 carbons,
m is an integer from 1 to 15,
n is an integer from 10 to 50,
Q is

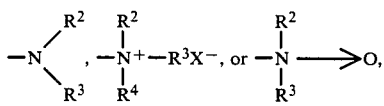

$R^2$ and $R^3$ are $C_{1-4}$ alkyl,
$R^4$ is hydrogen or $C_{1-4}$ alkyl, and
X is an anion.

Korzenowski, in EPO Pub. No. 0124236, discloses polymers derived from (1) at least one compound having the formula $$R_fC_mH_{2m}OC(O)C(R)=CH_2, \text{ and}$$

(2) at least one compound having the formula $$XCH_2CH(OH)CH_2OC(O)C(R)=CH_2$$

wherein
$R_f$ is straight or branched-chain perfluoroalkyl containing 4–20 carbons,
R is H or $CH_3$,
m is an integer from 1 to 15, and
X is Cl or Br.

The fluorine-containing polymeric compositions of this invention possess improved properties in comparison to those of the prior art. They are particularly intended for application as oil- and water-repellent finishes on nylon rainwear, and as such it is important that after application, the fluorine-containing polymeric finish composition will resist removal by laundering or dry cleaning. The compositions of this invention are particularly advantageous in that connection. On the other hand, the compositions of Fasick et al. are much less resistant to removal by laundering or dry cleaning. Because of their relatively large content of polymer units which are oxyethylated, the fluorine-containing terpolymers of Lore et al. are not suitable for rainwear. While the polymers of Korzenowski are effectively retained on fibrous substrates, including nylon, they are not suitable for use on rainwear.

DETAILED DESCRIPTION OF THE INVENTION

The fluorine-containing polymeric compositions of the present invention consist essentially of mixtures of (1) an addition polymer of at least one monomer having the formula $$CF_3CF_2(CF_2)_kC_mH_{2m}OC(O)C(R)=CH_2, \text{ and}$$

(2) an addition copolymer of
(a) at least one monomer having the formula $$CF_3CF_2(CF_2)_kC_mH_{2m}OC(O)C(R)=CH_2,$$

(b) at least one monomer having the formula $$XCH_2CH(OH)CH_2OC(O)C(R^1)=CH_2,$$

(c) at least one monomer having the formula $$R^2OC(O)C(R^3)=CH_2, \text{ and}$$

(d) at least one monomer having the formula $$H(OCH_2CH_2)_nOC(O)C(R^4)=CH_2$$

wherein
R, $R^1$, $R^3$, and $R^4$ are the same or different H or $CH_3$;
$R^2$ is alkyl containing 2 to 18 carbons;
X is Cl or Br;
k is an integer from 2 to 18;
m is an integer from 1 to 15; and
n is an integer from 5 to 50.

Based upon the total weight of the polymeric composition, the fluorinated monomer or mixture of fluorinated monomers will constitute 20 to 80 percent by weight of the composition; the chlorine- or bromine-containing monomer will constitute between 5 and 35 percent by weight of the composition; the alkyl acrylate or methacrylate will constitute between 5 and 55 weight percent of the composition and the oxyethylated acrylate or methacylate will constitute between 0.1 and 3 weight percent thereof. Preferably, the fluorinated monomer or mixture of monomers will constitute between 50 and 70 weight percent; the chlorine- or bromine-containing monomer constitute between 10 and 15 weight percent; the alkyl acrylate or methacrylate will constitute between 25 and 40 weight percent and the oxyethylated acrylate or methacrylate will constitute between 0.2 and 1 weight percent.

The polymeric compositions of the present invention are useful in imparting durable oil- and water-repellency to a wide range of fibrous materials. They are particularly useful for providing durable oil- and water-repellency to rainwear. The polymeric compositions can also be used for providing durable oil- and water-repellency to other substrates such as carpet fibers. They will also provide such carpet fibers with dry soil resistance.

The polymeric compositions of the present invention can be prepared by the use of well-known polymerization techniques and conditions. Thus they can be prepared using bulk, solution, suspension or emulsion techniques. In any event, however, it is necessary to polymerize the monomers in the order described herein in order to produce compositions having the advantageous durable oil- and water-repellent properties described herein. Thus, the polymeric compositions of the present invention are prepared by first subjecting a portion of the fluorine-containing monomer, or mixture of fluorine-containing monomers, to addition polymerization. Thereafter the remainder of the fluorine-containing monomer, or mixture of fluorine-containing monomers, is polymerized along with the chlorine- or bromine-containing monomer, alkyl methacrylate or acrylate, and polyoxyethylene methacrylate or acrylate. In particular, one first polymerizes between 60 weight percent and 90 weight percent of the total quantity of the fluorinated monomer or mixture of fluorinated monomers; then the remaining quantity of fluorinated monomer(s) is combined with 5 to 35 percent by weight of the chlorine- or bromine-containing monomer, between 5 and 55 weight percent of the alkyl acrylate or methacrylate and between 0.1 and 3 weight percent of the oxyethylated acrylate or methacrylate. The temperature of the polymerization will be that necessary to promote efficient initiation, and in bulk polymerization, the temperature at which the monomers will be in the liquid state. Preferably, the sequential addition polymerization process of this invention is run using an emulsion technique. In the most preferred technique, the fluorine-containing monomer(s) is mixed with cationic and/or nonionic dispersing agents and water and homogenized to provide a dispersion. A portion of that dispersion is subjected to addition polymerization. A second dispersion is prepared by combining the chlorine- or bromine-containing acrylate or methacrylate with the alkyl methacrylate or acrylate, the cationic or nonionic dispersing agent and water and homogenizing the same. To that second dispersion is added the remaining portion of the dispersion of the fluorine-containing monomer described above to give a third dispersion. The latter dispersion is then combined with the addition polymer prepared from the first dispersion and subjected to addition copolymerization.

Usually a mixture of fluorine-containing monomers is used for both the first and second steps of the polymerization process, because such monomers are most commonly available as mixtures. If one wishes to use a single monomer from such a mixture, it can be obtained by fractionation. In the usual commercial mixture, less than 5 percent by weight of the perfluoroalkyl radicals will be either 4 or 20 carbons in length, with 80 to 90 percent of the perfluoroalkyl chains containing 6 to 12 carbons, preferably 6 to 10 carbons, with an average between 6 and 8 carbons. The fluorinated monomers most preferred for the present invention are those wherein R is $CH_3$, m is 2, and the mixture of the monomers is such that in their perfluoroalkyl groups, $CF_3CF_2(CF_2)_k$, k is 2, 4, 6, 8, 10 and 12 in the approximate weight ratio of 2/35/30/18/8/3. Such a mixture of monomers has a weight average molecular weight of 522. That type of monomer is shown by U.S. Pat. Nos. 3,282,905 and 4,147,851, and corresponding fluorinated acrylates are shown by U.S. Pat. No. 3,645,989.

Of the chlorine- or bromine-containing acrylate or methacrylate monomer, 3-chloro-2-hydroxypropyl methacrylate is preferred. Ethyl methacrylate is preferred among the alkyl acrylates and methacrylates. Among the oxyethylated acrylates and methacrylates, the oxyethylated methacrylate having 10 oxyethylene radicals per molecule is preferred.

The 3-chloro- (or 3-bromo-) 2-hydroxypropyl acrylate or methacrylate monomer can be prepared by a variety of known techniques. Thus, for example, one can react glacial acrylic or methacrylic acid with epichlorohydrin (or epibromohydrin) as shown in U.S. Pat. No. 3,799,915. Alternatively, one can react acrylyl or methacrylyl chloride with glycerol alpha-monochlorohydrin (or glycerol alpha-monobromohydrin) as in U.S. Pat. No. 2,567,842. Preferably, 3-chloro-2-hydroxypropyl methacrylate is prepared by reacting $\geq 2$ two mols of glacial methacrylic acid per mol of epichlorohydrin.

Conventional free-radical initiators such as peroxy compounds and azo compounds can be used, e.g., N,N'-azo-bis(2-methylpropaneamidine dihydrochloride), 2,2'-azo-bis(2-methylbutanenitrile), 2,2'-azo-bis(2-methylpropanenitrile), benzoyl peroxide, and the like. Initiator concentration can be between about 0.05 and 0.2 percent based on the total weight of monomers. Likewise, conventional chain transfer agents, such as dodecylmercaptan, isooctyl thioglycolate, and the like, in amounts up to 3 percent by weight of the total weight of the monomers, can be used to control the molecular weight of the polymers (in some instances, they may not be necessary).

The polymeric compositions of the present invention are adapted to be marketed commercially in the form of stable aqueous dispersions. Both nonionic and cationic dispersing agents are suitable for preparation of dispersions of this invention. Typical nonionic dispersing agents such as ethoxylated alcohols, ethoxylated amines, and the like and mixtures thereof can be used. Conventional cationic dispersing agents such as dodecyltrimethylammonium chloride, octadecyltrimethylammonium chloride, dodecyldimethylamine acetate, octadecyldimethylamine acetate, bis(polyethyleneoxy)alkylmethylammonium methosulfate and poly(difluoromethylene),alpha-fluoroomega-[2-[[2-(trimethylammonio)ethyl]thio]ethyl],methyl sulfate and the like and mixtures thereof can be used. These dispersions can be applied to a wide variety of substrates by conventional technique, such as by spraying, dipping, padding, roller-coating (threadline application) or exhaust techniques.

The following tests were used to evaluate the end use properties of the polymeric compositions of the present invention on a variety of fibers and fabrics. Temperatures are in degrees Celsius.

Water-Repellency Test

Water repellency was measured by use of the AATCC Standard Test Method 22-1964.

Oil-Repellency Test (Adapted From AATCC Test Method 118)

A piece of fabric, treated with an aqueous dispersion of the polymers of this invention, is conditioned for a minimum of 2 hours at 23°±2° and 65±10% relative humidity. The repellency of carpet samples should be measured on the side of the yarn, not on the tips of the tufts. Beginning with the lowest numbered test liquid (Repellency Rating No. 1), one drop (approximately 5 mm diameter or 0.05-ml volume) is placed on each of three locations at least 5 mm apart. The drops are observed for 30 seconds. If, at the end of that period of time, two of the three drops are still spherical to hemispherical in shape with no wicking around the drops, three drops of the next higher numbered test liquid are placed on adjacent sites and observed again for 30 seconds. The procedure is continued until one of the test liquids results in two of the three drops failing to remain spherical or hemispherical, or wetting or wicking occurs. The oil-repellency rating of the yarn or fabric is the highest numbered test liquid for which two of three drops remain spherical or hemispherical with no wicking for 30 seconds.

| STANDARD OIL TEST LIQUIDS | |
|---|---|
| Oil-Repellency Rating Number | Composition |
| 1 | "Nujol"* |
| 2 | 65/35 "Nujol"/n-hexadecane by volume at 21° |
| 3 | n-hexadecane |
| 4 | n-tetradecane |
| 5 | n-dodecane |
| 6 | n-decane |

*"Nujol" is the trademark of Plough, Inc., for a mineral oil which has a Saybolt viscosity of 360/390 at 38° and a specific gravity of 0.880/0.900 at 15°.

Nylon Fabric Home Wash Durability Test (Modification of AATCC Test Method 130)

The specimens which have been air-dried and/or cured as described above are conditioned as before. A portion of each specimen is removed and a fluorine determination run on it. The remaining portion of each specimen is cured at elevated temperature and washed: 4-lb load with 28 g of "Tide" detergent, at a 12-minute cycle, a temperature of 60°±3° and a cold rinse. The specimens are dried at 71°±9° for 40 minutes. The foregoing washing and drying steps constitute one Home Wash Cycle. Thereafter, the specimens are conditioned, oil- and water-repellency are measured and fluorine determinations are made.

The following examples are illustrative of the invention. Unless otherwise indicated, all parts and percentages are by weight and temperatures are in degrees Celsius. In describing the polymers prepared in the examples, the percentages of monomer units given for the polymers are based on the weights of monomers charged to the reaction. The term "Fluorinated Methacrylate" means the most preferred fluorinated monomer described above.

EXAMPLE 1

The following materials were combined with strong agitation at 45°: aqueous dodecyltrimethylammonium chloride (96 g of a 50% solution), aqueous RO(CH$_2$C-H$_2$O)$_{16}$H wherein R denotes a mixture of alkyl radicals having an average of 13 carbon atoms (53.3 g of a 60% solution), Fluorinated Methacrylate (1600 g), and water (1158 g). The mixture is then homogenized and the resulting dispersion is diluted with rinse water (293 g) from the homogenizer. An 80% by weight portion of the resulting dispersion was designated Dispersion No. 1, and the remainder was designated Dispersion No. 2. A third dispersion was prepared from 2-ethylhexyl methacrylate (681 g), 3-chloro-2-hydroxypropyl methacrylate (681 g), the above-described oxyethylated mixture of alcohols (113 g) and water (1249 g). The materials for the third dispersion were combined with strong agitation at about 20°, and that mixture was then homogenized. Dispersion 2 was then combined with the third dispersion and collectively called Dispersion No. 3. Water (2324 g) was added to the polymerization vessel and reflux purged to replace all air with nitrogen. Monomer Dispersion No. 1 was sparged for one hour with nitrogen to remove all air and then added to the polymerization vessel along with dodecylmercaptan (89 g) as a chain transfer agent. The temperature of the dispersion was adjusted to 65° and N,N'-azo-bis(3-methylpropaneamidine dihydrochloride) (1.45 g) was added as a free radical initiator. The poly(oxyethylene) methacrylate (8.9 g) having the formula

$$H(OCH_2CH_2)_{10}OC(O)C(CH_3)=CH_2$$

was mixed with Dispersion No. 3 and the mixture sparged with nitrogen to remove air. One hour after polymerization of Dispersion No. 1 had been initiated the mixture of Dispersion No. 3 and the poly(oxyethylene) methacrylate was added to the polymerization vessel along with an additional quantity of the same azo initiator (1.45 g), and the reaction mixture was polymerized for four hours at 70°, resulting in a final product in the form of an aqueous emulsion weighing 8247 g (64 percent water). A portion of the product was diluted to a polymer mixture content of 3% and applied to nylon taffeta and nylon taslan by padding so as to give a 0.68 percent level of polymer mixture (dry basis) on the fabric. The oil- and water-repellencies of the treated fabrics are set forth in Table I.

TABLE I

| | Oil/Water Repellencies | | |
|---|---|---|---|
| Fabric | Initial | After 10 Home Washes | After 20 Home Washes |
| Nylon Taffeta | 6/100 | 5/100 | 3/100 |
| Nylon Taslan | 5/100 | 3/90 | 2-3/90 |

EXAMPLES 2 AND 3

The procedure of Example 1 was repeated using the same quantity of Fluorinated Monomer. However, the amounts of the three other monomers, the polyoxyethylated alcohol and the initiator were changed. The changes in the two steps of the polymerization process are shown in Table II. The oil- and water-repellency of the product of Example 1 were better after laundering than those of Examples 2 and 3.

TABLE II

|  | Example 2 (g) | Example 3 (g) |
|---|---|---|
| Initiator For 1st Step | 1.19 | 1.6 |
| Dodecyl Mercaptan | 71.6 | 96.0 |
| 3-Cl—2HO propyl Methacrylate | 394.0 | 800.0 |
| 2-Ethylhexyl Methacrylate | 394.0 | 800.0 |
| $H(OCH_2CH_2)10$—$OC(O)C(CH_3)=CH_2$ | 7.16 | 9.6 |
| Initiator For 2nd Step | 1.19 | 1.6 |
| Water | 722.3 | 1466.0 |

EXAMPLE 4

The procedure of Example 1 was repeated. However, ethyl methacrylate was substituted for 2-ethylhexyl methacrylate. The amounts of ethyl methacrylate and 3-chloro-2-hydroxypropyl methacrylate were such that the final product contained 31 percent ethyl methacrylate, 15 percent of 3-chloro-2-hydroxypropyl methacrylate and the same amounts of the Fluorinated Methacrylate and the polyoxyethylene methacrylate as in Example 1 (respectively 54 percent and 0.3 percent). At a loading of about 1000 ppm of fluorine on the weight of nylon fabric, the polymeric composition of this example was better than that of Example 1 for durability to dry cleaning.

We claim:

1. Fluorine-containing polymeric compositions consisting essentially of mixtures of
(1) an addition polymer of at least one monomer having the formula $$CF_3CF_2(CF_2)_kC_mH_{2m}OC(O)C(R)=CH_2, \text{ and}$$

(2) an addition copolymer of
  (a) at least one monomer having the formula $$CF_3CF_2(CF_2)_kC_mH_{2m}OC(O)C(R)=CH_2,$$

(b) at least one monomer having the formula $$XCH_2CH(OH)CH_2OC(O)C(R^1)=CH_2,$$

(c) at least one monomer having the formula $$R^2OC(O)C(R^3)=CH_2, \text{ and}$$

(d) at least one monomer having the formula $$H(OCH_2CH_2)_nOC(O)C(R^4)=CH_2$$

wherein
R, $R^1$, $R^3$, and $R^4$ are the same or different H or $CH_3$;
$R^2$ is alkyl containing 2 to 18 carbons;
X is Cl or Br;
k is an integer from 2 to 18;
m is an integer from 1 to 15; and
n is an integer from 5 to 50;
based upon the total weight of the polymeric composition, the fluorinated monomer or mixture of fluorinated monomers constituting 20 to 80 percent by weight of the composition; the chlorine- or bromine-containing monomer constituting between 5 and 35 percent by weight of the composition; the alkyl acrylate or methacrylate constituting between 5 and 55 weight percent of the composition and the oxyethylated acrylate or methacylate constituting between 0.1 and 3 weight percent thereof.

2. The composition of claim 1 wherein the polymeric units (1) and (2)(a) consists of copolymeric units in which 80–90% by weight of the perfluoroalkyl radicals contain 6 to 12 carbons.

3. The composition of claim 2 wherein the average of the chain lengths in the perfluoroalkyl radicals is 6 to 8 carbons.

4. The composition of claim 1 wherein R is $CH_3$.

5. The composition of claim 4 wherein m is 2.

6. The composition of claim 5 wherein the polymeric units (1) and (2)(a) consists of copolymeric units in which 80 to 90% by weight of the perfluoroalkyl radicals contain 6 to 12 carbons.

7. The composition of claim 6 wherein the average of the chain lengths in the perfluoroalkyl radicals is 6 to 8 carbons.

8. The composition of claim 7 wherein k is 2, 4, 6, 8, 10 and 12 in an approximate weight ratio fo 2/35/30/18/8/3 in said copolymeric units.

9. A process for imparting oil and water repellency to fibrous and filamentary substrates which comprises applying an aqueous dispersion of the compositions of claim 1 to substrates.

10. A process for imparting oil and water repellency to fibrous and filamentary substrates which comprises applying an aqueous dispersion of the compositions of claim 2 to substrates.

11. A process for imparting oil and water repellency to fibrous and filamentary substrates which comprises applying an aqueous dispersion of the compositions of claim 3 to substrates.

12. A process for imparting oil and water repellency to fibrous and filamentary substrates which comprises applying an aqueous dispersion of the compositions of claim 4 to substrates.

13. A process for imparting oil and water repellency to fibrous and filamentary substrates which comprises applying an aqueous dispersion of the compositions of claim 5 to substrates.

14. A process for imparting oil and water repellency to fibrous and filamentary substrates which comprises applying an aqueous dispersion of the compositions of claim 6 to substrates.

15. A process for imparting oil and water repellency to fibrous and filamentary substrates which comprises applying an aqueous dispersion of the compositions of claim 7 to substrates.

16. A process for imparting oil and water repellency to fibrous and filamentary substrates which comprises applying an aqueous dispersion of the compositions of claim 8 to substrates.

17. A fibrous or filamentary substrate which contains a coating of the composition of claim 1 in an amount sufficient to impart oil and water repellency to said substrate.

18. A fibrous or filamentary substrate which contains a coating of the composition of claim 2 in an amount sufficient to impart oil and water repellency to said substrate.

19. A fibrous or filamentary nylon substrate which contains a coating of the composition of claim 3 in an amount sufficient to impart oil and water repellency to said substrate.

20. A fibrous or filamentary nylon substrate which contains a coating of the composition of claim 4 in an amount sufficient to impart oil and water repellency to said substrate.

21. A fibrous or filamentary nylon substrate which contains a coating of the composition of claim 5 in an amount sufficient to impart oil and water repellency to said substrate.

22. A fibrous or filamentary nylon substrate which contains a coating of the composition of claim 6 in an amount sufficient to impart oil and water repellency to said substrate.

23. A fibrous or filamentary nylon substrate which contains a coating of the composition of claim 7 in an amount sufficient to impart oil and water repellency to said substrate.

24. A fibrous or filamentary nylon substrate which contains a coating of the composition of claim 8 in an amount sufficient to impart oil and water repellency to said substrate.

25. A process for manufacturing the composition of claim 1 which consists essentially of
(1) subjecting to addition polymerization at least one fluorine-containing monomer having the formula $$CF_3CF_2(CF_2)_k C_m H_{2m} OC(O)C(R)=CH_2, \text{ then}$$

(2) subjecting to addition polymerization a mixture of
(a) at least one fluorine-containing monomer having the formula $$CF_3CF_2(CF_2)_k C_m H_{2m} OC(O)C(R)=CH_2$$

(b) at least one monomer having the formula $$XCH_2CH(OH)CH_2OC(O)C(R^1)=CH_2,$$

(c) at least one monomer having the formula $$R^2OC(O)C(R^3)=CH_2, \text{ and}$$

(d) at least one monomer having the formula $$H(OCH_2CH_2)_n OC(O)C(R^4)=CH_2,$$

the amount of fluorine-containing monomer used in step (1) being between 60 and 90 weight percent of the total thereof used in the process.

* * * * *